United States Patent [19]

Miwa et al.

[11] Patent Number: 5,086,131

[45] Date of Patent: * Feb. 4, 1992

[54] PROCESS FOR PRODUCTION OF POLYETHYLENE

[75] Inventors: Yukimasa Miwa, Nagoya; Takeo Shimada, Yokkaichi; Shigekazu Hayashi, Yokkaichi; Yoshio Kobayashi, Yokkaichi; Yoshiteru Kageyama, Yokkaichi, all of Japan

[73] Assignee: Mitsubishi Petrochemical Company Limited, Tokyo, Japan

[ * ] Notice: The portion of the term of this patent subsequent to Jan. 12, 2005 has been disclaimed.

[21] Appl. No.: 64,707

[22] Filed: Jun. 22, 1987

Related U.S. Application Data

[63] Continuation of Ser. No. 840,545, Mar. 17, 1986, Pat. No. 4,719,270, which is a continuation of Ser. No. 506,588, Jun. 22, 1983, abandoned.

[30] Foreign Application Priority Data

Jun. 24, 1982 [JP] Japan ................... 57-108970

[51] Int. Cl.$^5$ ...................... C08F 6/02; C08F 10/02
[52] U.S. Cl. ...................... 526/68; 526/348; 526/348.5; 526/348.6
[58] Field of Search ............. 526/68, 84; 528/491

[56] References Cited

U.S. PATENT DOCUMENTS

| | | | |
|---|---|---|---|
| 3,070,589 | 12/1962 | Kirch et al. | 528/491 |
| 4,105,609 | 8/1978 | Machon et al. | 526/84 |
| 4,238,355 | 12/1980 | Shipley et al. | 526/114 |
| 4,388,219 | 6/1983 | Bujadoux | 526/116 |
| 4,430,488 | 2/1984 | Zboril | 526/84 |
| 4,486,579 | 12/1984 | Machon et al. | 526/65 |
| 4,719,270 | 1/1988 | Miwa et al. | 526/84 |

*Primary Examiner*—Edward J. Smith
*Attorney, Agent, or Firm*—Oblon, Spivak, McClelland, Maier & Neustadt

[57] ABSTRACT

A novel process for production of polyethylene comprises polymerizing ethylene or a mixture of ethylene and at a temperature of 125° C. or more, wherein an Ziegler-type catalyst at a pressure of 200 atm or more and at a temperature of 120° C. or more, wherein an organic peroxide is added to the resulting polymerization product taken out of a reaction zone to deactivate the remaining catalyst. Formation of undesired oligomers or low-molecular polymers is prevented because the reaction does not proceed in the polymerization product taken out of the reaction zone. There is almost no retardation of the polymerization reaction even by the recycled use of the monomer separated and collected from the polymerization product.

6 Claims, 1 Drawing Sheet

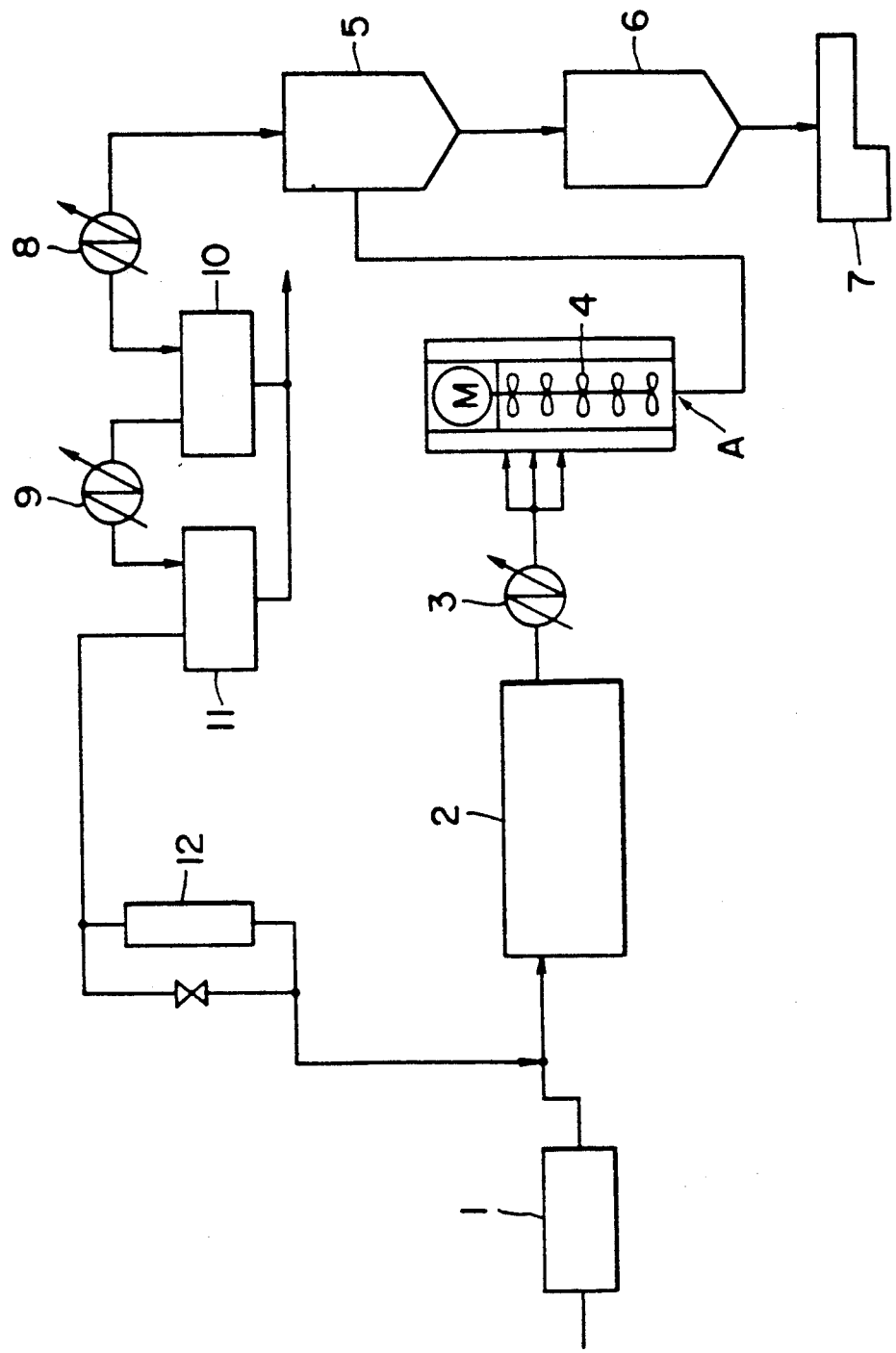

PROCESS FOR PRODUCTION OF POLYETHYLENE

This is a continuation of application Ser. No. 06/840,545, filed Mar. 17, 1986, now U.S. Pat. No. 4,719,270 which is a continuation of abandoned application Ser. No. 506,588 filed June 22, 1983, now abandoned.

BACKGROUND OF THE INVENTION (1) Field of the Invention

This invention relates to a novel continuous process for production of polyethylene. More particularly, this invention relates to an improved process for production of polyethylene in the presence of a Ziegler-type catalyst at high temperature and high pressure.

Hitherto, polymerization and copolymerization of ethylene have been carried out by the use of a conventional catalyst at a pressure of 200 atmospheres or more and at a temperature of 125° C. or more. In such processes, the resulting reaction mixture is introduced into at least one separator when it comes out of a polymerization reactor. This separator is operated to separate ethylene (and any other monomer) from the polymer produced in the reactor in one or more steps. In general, the pressure in the first separator is selected to be 500 atmospheres or less.

When a Ziegler-type catalyst is used in the polymerization reactor in the conventional processes, polymerization (homo- or co-polymerization) or oligomerization of monomer (or monomers) occurs successively under the above mentioned operating conditions of the separator (e.g., temperature, pressure, residence time, etc.), which results in formation of undesired products such as low-molecular products and waxy products, and the like.

The present invention aims to avoid such undesirable results.

(2) Prior Art

In the low-pressure polymerization of α-olefins in the presence of a Ziegler-type catalyst, it has been known to terminate the reaction by adding to the reaction mixture a variety of reaction agents such as alcohols, epoxides or alkali metal hydroxides.

Thus, it would be readily considered by those skilled in the art to add a polymerization inhibitor or a catalyst-decomposition agent to the reaction mixture to prevent polymerization or oligomerization in the above mentioned separator.

In industrial plants operated at high pressure and temperature, however, an unreacted monomer or monomers are normally recycled for reuse. If the conventional reactive agent mentioned above in an amount sufficient to deactivate the catalyst should be added at the outlet of the reactor or the inlet of the separator, the reactive agent will also be recycled into the polymerization reactor to retard the polymerization reaction.

In this connection, there is proposed as shown in Japanese Laid-Open Patent Specification No.11182/76 a method for preventing retardation of the recycling polymerization reaction wherein a solid alkali metal or solid salt thereof is used as a reactive agent, and the resulting reaction mixture of the metal salt and the catalyst is caused to remain in the resulting polymer.

The alkali metal or salt thereof is insoluble in a nonpolar hydrocarbon solvent which is sometimes used as a polymerization dispersion medium. Thus, it is very difficult to add such an agent to a high-pressure region such as the position just before the outlet valve of the polymerization reactor or the inlet of the separator. Furthermore, the additive agent is solid and thus has poor reactivity with the catalyst. In this case, in order to deactivate the catalyst completely, it is generally necessary to use the additive agent in an amount of 1 or more gram equivalent of the alkali metal contained in the metal salt per the sum of aluminum and titanium in the gram atom contained in the catalyst.

SUMMARY OF THE INVENTION

In order to produce polyethylene with a Ziegler-type catalyst at high temperature and pressure and to prevent formation of undesired products, we have conducted research on a novel reactive agent which can effectively prevent formation of the undesired products, can be readily added to a high-pressure region, and will not retard the polymerization reaction as a result of recycled use of an unreacted monomer and have thus developed the present invention.

The process for production of polyethylene in accordance with the present invention comprises introducing a feed material containing ethylene or a monomer material consisting of ethylene and a comonomor copolymerizable therewith in a non-batchwise fashion into a polymerization zone which is maintained at a pressure of 200 atmospheres or more and at a temperature of 125° C. or more and also is under the action of a catalyst comprising a transition-metal derivative and an organoaluminum derivative, causing polymerization of the monomer, taking the resulting polymerization product out of the polymerization zone in a non-batchwise fashion, and separating the resulting polymer from the unreacted monomer to recover the polymer, the process being characterized is that an organic peroxide is added to the polymerization product which is removed from the reaction zone before the step of recovering the polymer to deactivate the remaining catalyst.

The catalyst-deactivator to be used in the present invention can exhibit a catalyst-deactivation effect in a small quantity because the deactivator is an organic peroxide and thus is soluble in the polymerization product taken out of the polymerization zone. Furthermore, poisoning of the catalyst is not observed even when polymerization product residue after recovering the polymer, such as the unreacted monomer and (or) polymerization dispersion medium, is reused in the polymerization zone. It is assumed that the organic peroxide added is decomposed and converted to substances which are catalytically non-poisonous (e.g., reaction product of the peroxide itself or reaction product thereof with the catalyst), because the peroxide reacts with the active catalyst present in the polymerization product, or the polymerization product removed from the polymerization zone is still in the state of high temperature and pressure. It is to be understood, however, that the present invention is not restricted by such assumption.

Industrial advantages as given below are obtained in accordance with the present invention.

(1) Side reactions which for undesired high-molecular products such as grease or wax, which may occur at the outlet of the reactor or succeeding apparatus parts, can be avoided.

(2) Other possible side reactions, such as formation of oligomers due to dimerization reaction or the like of ethylene or other monomers can also be avoided.

(3) Recycled use of the unreacted gas does not have an adverse effect on the polymerization reaction, and thus continuous production can be successfully carried out.

BRIEF DESCRIPTION OF THE DRAWING

In the accompanying drawing, the single figure is a flow sheet showing one mode of practice of the present invention.

DETAILED DESCRIPTION OF THE INVENTION

1. Polymerization at high temperature and high pressure

1) Definition

As described above, polymerization of ethylene at high temperature and pressure by the use of a Ziegler-type catalyst is well known in the art.

More specifically, the conventional process for polymerization relevant to the present invention comprises introducing a feed material containing ethylene or a monomer material consisting of ethylene and a monomer copolymerizable therewith in a non-batchwise fashion into a polymerization zone which is maintained at a pressure of 200 atmospheres or more and a temperature of 125° C. or more and is also under the action of a catalyst comprised of a transition-metal derivative and an organoaluminum derivative, taking the resulting polymerization product out of the polymerization zone in a non-batchwise fashion, and recovering the resulting polymer.

2) Catalyst

The term "comprised of a transition-metal derivative and organoaluminum derivative" means that the catalyst may contain carriers, electron donors and other auxiliary components in addition to the essential two components and also can be prepared by any method known in the art.

The catalyst used is selected from those which belong to the category of so-called Ziegler-type catalysts and are composed of a combination of the following components A and B.

(1) Component A

The component A is an organometallic compound.

The organometallic compound used as a cocatalyst in the present invention may be selected from organometallic compounds of metals of Groups I to III of the periodic table which are known as cocatalysts for the Ziegler-type catalysts. Particularly, organoaluminum compounds are preferable.

The organoaluminum compounds include those which have the formula:

wherein: $R^1$ represents hydrogen or a hydrocarbon residue having 1 to 20 carbon atoms, preferably, 1 to 6 carbon atoms; $X^1$ represents hydrogen, halogens or an alkoxy group having 1 to 20 carbon atoms, preferably, 1 to 6 carbon atoms; and p represents a value of $0 \leq p \leq 2$, preferably, $0 < p \leq 1.5$. Examples of such an organoaluminum compound are (a) trialkylaluminums such as trimethylaluminum, triethylaluminum, triisobutylaluminum, trioctylaluminum and tridecylaluminum; (b) dialkylaluminum monohalides such as diethylaluminum monochloride and diisobutylaluminum monochloride; (c) alkylaluminum sesquihalides such as ethylaluminum sesquihalide; (d) dialkylaluminum hydrides such as dethylaluminum hydride and diisobutylaluminum hydride; and (e) alkylaluminum alkoxides such as diethylaluminum ethoxide, diethylaluminum butoxide and diethylaluminum phenoxide.

These organoaluminum compounds of items (a) through (e) may be used singly or in mixtures of two or more of these compounds. In the polymerization under high temperature and pressure according to the present invention, a dialkylaluminum monohalide or an organoaluminum compound mixture of a dialkylaluminum monohalide with an organoaluminum compound of item (a), (c), (d) or (e) is preferably used. With regard to the amount of the organoaluminum compounds used, there is no specific limitation. However, it is desirable that the organoaluminum compound be used in a quantity such that the atomic ratio of Al/Ti with respect to a solid catalyst component as described hereinafter is in the range of from 3 to 200, preferably from 6 to 20.

As the component B, a transition-metal compound which has been generally employed in a Ziegler-type catalyst can be used.

From the viewpoint of catalytic activity, etc., however, the following component is preferably used

(2) Component B

The component B is a contact product of a magnesium compound defined as a component (a) and a titanium compound defined as a component (b).

a) Magnesium compound

A magnesium compound which is suitable for use in the present invention is any of magnesium compounds in the form of a solid or a liquid.

Examples of such a magnesium compound are i) magnesium halides such as magnesium dichloride, magnesium dibromide and magnesium diiodide; ii) halohydrocarbyloxymagnesiums such as magnesiumethoxychloride and magnesiumhydroxychloride; iii) magnesium dialcoholates such as magnesium diethoxide and magnesium dimethoxide; iv) magnesium oxide and magnesium carbonate, and v) organomagnesium compounds such as diethylmagnesium and ethylmagnesium chloride. Among these, the magnesium compounds of items (i), (ii) and (v) are preferable; and magnesium dichloride is particularly preferable. It is desirable that the solid magnesium compound have a specific surface area of at least 5 m²/g for the purpose of providing a highly active catalyst.

As the magnesium compound, use may also be made of those obtained by subjecting magnesium halides, such as magnesium dichloride, to dissolution in a suitable solvent and then to re-precipitation from the solution. Such re-precipitated magnesium compounds can be prepared by dissolving a magnesium halide in the presence or absence of an organic solvent in a medium selected from alcohols ROH wherein R represents a hydrocarbon residue having 3 to 10 carbon atoms; ethers R-O-R' therein R and R' represent a hydrocarbon residue having 2 to 8 carbon atoms, or R and R' form a ring system containing a 5-to 8-membered ring; phosphoric esters PO(OR)$_3$ wherein R represents a hydrocarbon residue having 2 to 10 carbon atoms; and titanic acid esters Ti(OR)$_4$ wherein R represents a hydrocarbon residue having 3 to 10 carbon atoms and by adding a halogenating agent such as TiCl$_4$ and SiCl$_4$ or a reducing agent such as an alkylsiloxane or a derivative thereof to the resultant solution thereby to cause reprecipitation.

b) Titanium compound

A titanium compound suitable for the present invention is selected from halides, oxynalides, alcoholate and alkoxyhalides of titanium. Examples of these compounds are as follows.

i) Compounds of tetravalent titanium $TiCl_4$, $TiBr_4$, $Ti(OC_2H_5)Cl_3$, $Ti(O-n-C_4H_9)_3Cl$, and $Ti(O-n-C_4H_9)_4$.

ii) Compounds of trivalent titanium $TiCl_3$, $TiBr_3$, and $Ti(OC_2H_5)Cl_2$.

When a tetravalent titanium compound in the form of a liquid is used in the polymerization under high temperature and pressure according to the present invention, the resulting catalyst exhibits a high catalytic activity which leads to the production of a desirable copolymer.

The above mentioned magnesium compound and titanium compound are essential components in the present invention. The component B may contain an auxiliary component, if necessary. The use of an auxiliary component may be effective for further enhancing the uniformity of the resulting copolymer. Examples of auxiliary components are electron donors such as alcohols, ethers and esters; metal halide compounds such as $SiCl_4$ and $AlCl_3$; and polysiloxanes such as alkylhydropolysiloxanes and dialkylpolysiloxanes. A suitable method of using these auxiliary components is described in concrete terms in Japanese Patent Application Laid-Open Nos. 55-21435 and 55-40745.

Contact condition

The contact between the component (a) and the component (b) may be carried out under any conditions conventionally known. However, it is desirable that the contact of these components with each other be carried out at a temperature of from $-50°$ to $200°$ C., in general. The contact time is usually in a range of from about 10 minutes to about 5 hours. It is preferable that the contact between the components (a) and (b) be carried out with stirring. The use of a mechanical pulverization means such as a ball mill or a vibration mill may serve to afford a more thorough contact between the components (a) and (b).

The contact between the components (a) and (b) may also be carried out in the presence of a dispersion medium. Examples of suitable dispersion mediums for the contact are hydrocarbons, halogenated hydrocarbons and dihydrocarbylpolysiloxanes. Examples of hydrocarbons are hexane, heptane, benzene, toluene and cyclohexane. Examples of halogenated hydrocarbons are n-butyl chloride, 1,2-dichloroethane, chloroform, carbon tetrachloride, o-chlorotoluene, m-chlorotoluene, p-chlorotoluene, benzyl chloride, benzylidene chloride and iodobenzene. Examples of dihydrocarbylpolysiloxanes are dialkylpolysiloxanes such as dimethylpolysiloxane and methylphenylpolysiloxane.

Quantity ratio

The quantity of each component used may be arbitary as long as the advantages of the present invention can be attained. Generally, the following range is preferable. The mole ratio of Mg/Ti, on which the quantity ratio of the component (a) to the component (b) depends, is in the range of, ordinarily, from 0.5 to 50, preferably, from 1 to 20.

(3) Quantity ratio between components A and B

The quantity ratio between the components A and B is not basically limited but is preferably within the range of 3 to 200, particularly 6 to 20, in terms of the Al/Ti atomic ratio.

(4) Preparation of catalyst

The catalyst is prepared by combining the components A and B within or outside the polymerization zone. The component A alone or a combination of the components A and B is injected into the polymerization zone under a high pressure by means of a high-pressure pump. For this reason, these components should be in the form of a liquid, or fine powder or its slurry and, if they are powdery, their particle size should preferably be of the order of $10\mu$ or less, particularly of the order of 1 to $5\mu$.

3) Monomers

The "monomer" to be polymerized in the presence of the above mentioned catalyst is ethylene or a mixture of ethylene and a comonomer copolymerizable therewith.

In this case, the comononers include, for example, an $\alpha$-olefin such as propylene, butene-1, hexene-1, 4-methylpentene-1 and octene-1. The quantity of the comonomer is normally such that the amount of the comonomeric component contained in the resulting polymer will be about 0 to about 20% by weight.

Thus, the quantity of the comonomer fed together with ethylene for polymerization is generally 0 to 10 parts and preferably 0.3 to 5 parts by volume per 1 parts by volume of ethylene.

Accordingly, the term "monomer" used herein encompasses both ethylene and a mixture thereof with a comonomer. Thus, the term "polyethylene" herein encompasses both ethylene homopolymer and ethylene copolymer. Also, the term "polymerization" herein encompasses both homopolymerization and copolymerization.

(4) Polymerization operation

The polymerization apparatus which is maintained at a specific temperature and a specific pressure and also accommodates a polymerization zone under the action of the above mentioned catalyst may be an internally stirring-type autoclave reactor, a tubular reactor, a combination apparatus of the autoclave reactor and the tubular reactor, or some other suitable reactor.

The monomer is polymerized by introducing a feed material containing the monomer into the apparatus in a non-batchwise fashion. The term "a feed material containing the monomer" used herein means a feed material comprising the monomer and a polymerization dispersion medium and (or) a catalyst and (or) molecular weight-modifying hydrogen, etc. These components constituting the feed material can be in the state of coexistence or non-coexistence.

The term "in a non-batchwise fashion" herein means a continuous fashion or an intermittent fashion.

The polymerization product taken out of the polymerization zone in a non-batchwise fashion, which comprises polymer, unreacted monomor, hydrogen, a polymerization dispersion medium, etc., is then sent to a monostep or multistep separator, where the polymerization product is subjected to the condition of reduced pressure or a lower temperature to recover the resulting polymer. After the recovery of the polymer, if necessary, a desired component is recovered or separated from the polymerization product. Then the remaining components are ordinarily recycled to the polymerization zone. The meritorious effect of the present invention, however, can be obtained even when the remaining components of the polymerization product from which the polymer has been recovered are not recycled into the polymerization zone because deactivation of the catalyst with organic peroxides is effective for preventing the formation of side-reaction products (e.g., for controlling the formation of oligomers).

One example of the apparatus suitable for use in the present invention is shown in FIG. 1.

Ethylene or a gaseous mixture of ethylene and a comonomer for the polymerization is compressed in a first compressor 1, re-compressed in a second compressor 2 to a pressure as high as or somewhat higher than the polymerization pressure, adjusted to a specific temperature by a heat exchanger 3 and then introduced into a reactor 4 for polymerization reaction.

The polymerization product obtained via polymerization reaction in the reactor 4 is taken out of the bottom of the reactor 4 and separated into polymer and unreacted monomer in a high-pressure separator 5. The resulting polymer is separated from the unreacted monomer, oligomer and the like in a low-pressure separator 6 and then introduced into a pelletizer 7 to be formed into pellets.

The unreacted monomer separated and collected by the high-pressure separator 5 is cooled in coolers 8, 9, separated from low-molecular polymers and oligomer by drain separators 10, 11, mixed with a monomer supplied via a filter 12, and reused for polymerization.

Preferred ranges of the polymerization conditions, etc. are shown below.

(1) Polymerization conditions (i) Polymerization pressure

The pressure used in the polymerization process is more than 200 kg/cm$^2$, preferably, from 500 to 4,000 kg/cm$^2$, more preferably, from 700 to 3,000 kg/cm$^2$.

(ii) Polymerization temperature

The polymerization temperature is at least 125° C., preferably, in the range of from 150° to 350° C., more preferably, from 200° to 320° C.

(2) High-pressure separator

The separator is operated at a pressure of generally 100 to 350 kg/cm$^2$, preferably 180 to 250 kg/cm$^2$, and at a temperature of generally 150° to 300° C., preferably 200° to 250° C.

(3) Low-pressure separator

The separator is operated at a pressure of generally 0 to 5 kg/cm$^2$, preferably 0.5 to 3 kg/cm$^2$ and at a temperature of generally 150° to 300° C., preferably 180° to 250° C.

2. Treatment with catalyst-deactivators

In the process for polymerization at high temperature and high pressure as described above, the present invention is characterized in that the catalyst is deactivated by adding organic peroxides to the polymerization product (the resulting polymer and unreacted monomer) removed from the reaction zone.

Deactivation of the catalyst presumably results from destruction of at least one of the two essential components of the catalyst described above.

1) Organic peroxides

As the organic peroxides for the present invention, most of the peroxides which have been employed as a radical catalyst for producing the so-called high-pressure polyethylene can be used.

Specific examples of such compounds include diacylperoxides such as acetylperoxide, isobutylperoxide, and 3,5,5-trimethylhexanoylperoxide; dialkylperoxides such as di-tert-butylperoxide; peroxyesters such as t-butylperoxyacetate, t-butylperisobutyrate and t-butylperoxypivalate; ketone peroxides such as methyl ethyl ketone peroxide; peroxyketal such as 1,1-bis(t-butylperoxy)cyclohexane; hydroperoxides such as paramenthane hydroperoxide; peroxy dicarbonates such as diisopropyl peroxydicarbonate and di-2-ethylhexyl peroxydicarbonate; and acetylcyclonexyl sulfonyl peroxide. It is preferable that the organic peroxides have a decomposition temperature in the range of 60° to 180° C., preferably 90° to 150° C., the decomposition temperature herein meaning the temperature at which half of the quantity of the organic peroxide is decomposed in one minute. Among others, peroxyesters, diacylperoxides and peroxydicarbonates which have a decomposition temperature of the above mentioned range are especially preferred. The amount of the organic peroxides to be used should be sufficient to deactivate the catalyst without fail. In general, it is desirable with respect to this amount that the ratio of the organic peroxide in mols to aluminum and titanium in gram atom contained in the catalyst be in the range of from 0.02 to 0.8 and preferably from 0.08 to 0.20.

The organic peroxide is normally added in the form of a solution thereof, e.g., the solution in a hydrocarbon. A paraffin, an olefin or an aromatic or alicyclic hydrocarbon having 6 to 20, preferably 6 to 12 carbon atoms can be as the hydrocarbon. Preferred are hexane, heptane, octane, decane, toluene and xylene. In this case, the concentration of the peroxide in the hydrocarbon is generally in the range of 0.01 to 95% by weight, preferably in the range of 1 to 10% by weight.

2) Addition of organic peroxides and treatment

The organic peroxide is added to the polymerization product remove from the polymerization zone. From the viewpoint of preventing a side reaction due to the still active catalyst, it is preferable to add the peroxide immediately after the product has been removed from the polymerization zone. Thus, the organic peroxide is preferably added at the position nearest to the outlet valve outside of the polymerization reactor, e.g., at the point A shown in FIG. 1. When the polymerization zone is not adjacent to the outlet valve in the polymerization zone, the peroxide can also be added in the polymerization reactor to the polymerization product (which has, of course, been taken out of the polymerization zone).

Treatment with the organic peroxide is generally conducted under conditions which are milder than the temperature and pressure conditions in the polymerization zone. However, in view of the recycling of the remaining polymerization product (after recovering the resulting polymer), the conditions will be higher than room temperature and atmospheric pressure. In general, the ordinary treatment conditions are approximately a temperature of 125° to 250° C., preferably, 150° to 250° C. and a pressure of 150 to 2,500 atmospheres. In order to obtain good contact between the organic peroxide and the catalyst, it is preferable to add with stirring the peroxide in the form of a relatively dilute solution (about 1% by weight or less).

The deactivation of the catalyst with the organic peroxide can also be conducted in a multistep manner as necessary.

The treatment of the polymerization product after addition of the organic peroxide is essentially the same as that in the conventional process. As necessary, however, it is also possible to filter or distill a liquid-phase portion after removing the polymer.

3. Examples of Experiments

Examples 1 through 12

Polymerization (i.e. homopolymerization or copolymerization) of ethylene was conducted under a high pressure of 900 atmospheres under the conditions given below by means of the high-pressure polymerization apparatus for ethylene comprising an internally stirring-type autoclave reactor having an internal space of 1.5 liter, a first separator (high pressure separator) maintained at a pressure of 200 atmospheres and a second separator (low-pressure separator) maintained at a pressure of 3 atmospheres, which were connected in series.

More specifically, the reaction temperature was of the order of 240° C., the temperature within the first separator was 210° to 240° C., and the temperature within the second separator was 190° to 220° C. The catalyst system used was composed of a co-pulverized mixture of $MgCl_2$ and $TiCl_4$ (Ti content supported being 9% by weight) and diethylaluminum, the ratio of Al/Ti being 12. The amounts supplied of ethylene, a comonomer, and hydrogen chain transfer agent are shown in Table 1, respectively. Incidentally, unreacted ethylene (or unreacted ethylene and comonomer in the case of copolymerization) separated from the resulting polymer in the first separator was recycled into the polymerization apparatus.

At a position just before the take-out valve of the reactor were added the above mentioned organic peroxide in Examples 2, 4, 6, 8 and 10 and the ethyl alcohol in Examples 11 and 12 for the purpose of providing comparative examples.

The results are shown in Table 2.
In Table 1, the following items are shown in the corresponding columns, respectively.
(a) Example Nos.
(b) Pressure in the reactor ($Kg/cm^2$)
(c) Temperature in the reactor (° C.)
(d) Amount of ethylene supplied into the reactor (Kg/Hr)
(e) Comonomers
(f) Amount of the comonomer supplied into the reactor (Kg/Hr)
(g) Amount of hydrogen supplied into the reactor (liter/Hr)
(h) Deactivator used
(i) Amount of the deactivator added (the ratio of the deactivator in millimol to aluminum and titanium in milliator present in the catalyst supplied to the reactor)
(j) Pressure in the first separator ($Kg/cm^2$)
(k) Temperature in the first separator (° C.)

In Table 2, the following items are shown in the corresponding columns, respectively.
(a) Example Nos.
(b) Melt index of polyethylene (g/10 minutes, according to ASTM D-1238) and density of polyethylene ($g/cm^3$ according to ASTM D-1505)
(c) Output of polymers per hour (Kg/Hr)
(d) Activity of catalyst (g-PE/g-Ti)
(e) Amount of wax collected by the separator provided in the recycling line of unreacted gases separated from the polymer by the first separator (g/Hr)
(f) Concentration of oligomers contained in the inlet gas of the reactor (% by weight, the oligomer meaning the component of $C_8$ or more detected by introducing the inlet gas into an on-line gas chromatography apparatus.)

The measurements were conducted on samples (A) taken after polymerization for 2 hours and samples (B) taken after polymerization for 10 hours. In accordance with these methods, it can be made clear that even by recycling organic peroxides, the compounds formed in the reaction of organic peroxides and Ziegler-type catalysts, the polymerization is not adversely affected, and undesirable side reactions are prevented.

TABLE 1

| | Polymerization Conditions, etc. | | | | | | | | | |
|---|---|---|---|---|---|---|---|---|---|---|
| | Reaction conditions | | Amount of ethylene gas Kg/Hr | Amount of co-monomers | | Amount of hydrogen Nl/Hr | Deactivators | | The first separator | |
| Example | pressure Kg/cm² | temp. °C. | | species | amount Kg/Hr | | species | amount deactivator/ Al + Ti | pressure kg/cm² | temp. °C. |
| 1 | 900 | 240 | 16 | propylene | 24 | 5 | — | — | 200 | 220 |
| 2 | 900 | 240 | 16 | propylene | 24 | 5 | di-2-ethyl-hexyl peroxydicarbonate | 0.1 | 200 | 220 |
| 3 | 900 | 240 | 16 | 1-hexene | 35 | 2 | — | — | 200 | 210 |
| 4 | 900 | 240 | 16 | 1-hexene | 35 | 2 | t-butyl-peroxy-pivalate | 0.15 | 200 | 210 |
| 5 | 900 | 240 | 30 | — | — | 40 | — | — | 200 | 240 |
| 6 | 900 | 240 | 30 | — | — | 40 | acetyl-peroxide | 0.12 | 200 | 240 |
| 7 | 900 | 240 | 16 | 1-Butene | 30 | 5 | — | — | 200 | 220 |
| 8 | 900 | 240 | 16 | 1-Butene | 30 | 5 | Octanoyl peroxide | 0.13 | 200 | 220 |
| 9 | 900 | 260 | 16 | 1-Hexene | 17 | 5 | — | — | 200 | 220 |
| 10 | 900 | 260 | 16 | 1-Hexene | 17 | 5 | t-Butylperoxy isobutyrate | 0.12 | 200 | 220 |
| 11* | 900 | 240 | 16 | propylene | 24 | 5 | ethanol | 0.1 | 200 | 220 |

TABLE 1-continued

| | Polymerization Conditions, etc. | | | | | | Deactivators | | The first separator | |
|---|---|---|---|---|---|---|---|---|---|---|
| | Reaction conditions | | Amount of ethylene gas Kg/Hr | Amount of co-monomers | | Amount of hydrogen Nl/Hr | | amount deactivator/ Al + Ti | pressure kg/cm² | temp. °C. |
| Example | pressure Kg/cm² | temp. °C. | | species | amount Kg/Hr | | species | | | |
| 12* | 900 | 240 | 16 | propylene | 24 | 5 | ethanol | 0.5 | 200 | 220 |

Note:
*Comparative example

TABLE 2

| | | Results of Polymerization | | | | | |
|---|---|---|---|---|---|---|---|
| Examples | | MFR g/10 min. | Density g/cm³ | Output Kg/Hr | Catalytic activity g-PE/g-Ti | Amount of wax g/Hr | Concentration of oligomers % by weight |
| 1 | A** | 1.1 | 0.9205 | 7.2 | 167,000 | 420 | not more than 1 |
| | B** | 1.2 | 0.9200 | 7.3 | 169,000 | 452 | 6 |
| 2 | A | 0.9 | 0.9205 | 7.0 | 162,000 | 5. | not more than 1 |
| | B | 1.0 | 0.9205 | 7.4 | 171,000 | 6 | " |
| 3 | A | 1.2 | 0.9195 | 8.6 | 299,000 | 430 | not more than 1 |
| | B | 1.3 | 0.9210 | 8.7 | 302,000 | 565 | 12 |
| 4 | A | 1.1 | 0.9190 | 8.4 | 292,000 | 12 | not more than 1 |
| | B | 1.2 | 0.9190 | 8.5 | 295,000 | 15 | " |
| 5 | A | 4.2 | 0.9560 | 5.4 | 250,000 | 280 | not more than 1 |
| | B | 4.6 | 0.9550 | 5.3 | 245,000 | 334 | 4 |
| 6 | A | 4.0 | 0.9560 | 5.2 | 241,000 | 3 | not more than 1 |
| | B | 4.2 | 0.9560 | 5.3 | 245,000 | 3 | " |
| 7 | A | 1.6 | 0.9220 | 7.6 | 287,000 | 360 | not more than 1 |
| | B | 1.8 | 0.9215 | 7.8 | 294,000 | 410 | 8 |
| 8 | A | 1.6 | 0.9220 | 7.6 | 285,000 | 8 | not more than 1 |
| | B | 1.4 | 0.9220 | 7.8 | 297,000 | 6 | " |
| 9 | A | 12 | 0.9290 | 9.6 | 273,000 | 520 | 2 |
| | B | 14 | 0.9280 | 9.5 | 265,000 | 675 | 14 |
| 10 | A | 12 | 0.9285 | 9.5 | 263,000 | 24 | not more than 1 |
| | B | 13 | 0.9290 | 9.4 | 266,000 | 26. | " |
| 11* | A | 1.2 | 0.9205 | 7.1 | 164,000 | 392 | not more than 1 |
| | B | 1.4 | 0.9210 | 6.5 | 129,000 | 405 | 5 |
| 12** | A | 1.3 | 0.9200 | 7.2 | 125,000 | 250 | not more than 1 |
| | B | 1.8 | 0.9220 | 6.8 | 76,000 | 280 | 3 |

Note.
*Comparative example
**Sample A taken 2 hours after commencing polymerization
Sample B taken 10 hours after commencing polymerization

What is claimed is:

1. A process for the high pressure production of copolymers of ethylene, which comprises:
   (a) introducing a feed material comprising ethylene and a comonomer copolymerizable therewith in a non-batchwise manner into a polymerization zone which does not contain a dispersant, which is maintained at a pressure of at least 200 atmospheres and at a temperature of 150°-320° C. and which contains a catalyst comprised of a titanium compound and an organoaluminum derivative combined in such amounts that the atomic ratio Al/Ti ranges from 6-20;
   (b) polymerizing the monomer reactants in a non-batchwise manner;
   (c) withdrawing polymerized material at a temperature of 150°-250° C. from said polymerization zone and adding from 0.08-0.20 mole of t-butyperoxypivalate per gram atom of the sum of the gram atoms of aluminum and titanium in said catalyst, to said withdrawn polymerization material in order to deactivate the catalyst therein;
   (d) separating the polymer product component of the withdrawn material from any unreacted monomer under superatmospheric pressure, thereby affecting polymer product recovery; and
   (e) recycling the separated unreacted monomer of step (d) to said polymerization zone.

2. The process according to claim 1, wherein said comonomer is propylene, butene-1, hexene-1,4-methylpentene-1 or octene-1.

3. The process according to claim 1, wherein the amount of said comonomer ranges from 0 to 10 parts by volume per volume part of ethylene.

4. The process according to claim 1, wherein the t-butyperoxypialate is supplied to step (c) in the form of an organic hydrocarbon solution at a concentration of 0.01% to 95% by weight.

5. The process according to claim 1, wherein the t-butylperoxypivalate is added to the withdrawn polymerization product which is under a pressure of at least 150 atmospheres.

6. The process according to claim 1, wherein said separation step (d) is a two-step separation process of a first high pressure separation step conducted at a pressure of 100 to 350 kg/cm², followed by a low pressure separator step operated at a pressure of 0 to 5 kg/cm².

* * * * *